(12) United States Patent
Michelau et al.

(10) Patent No.: US 7,625,033 B2
(45) Date of Patent: Dec. 1, 2009

(54) ACCESSORY LATCHING ASSEMBLY

(75) Inventors: Frederick Michelau, Des Plaines, IL (US); Timothy Seckel, Streamwood, IL (US)

(73) Assignee: Radio Flyer, Inc., Chicago, IL (US)

( * ) Notice: Subject to any disclaimer, the term of this patent is extended or adjusted under 35 U.S.C. 154(b) by 37 days.

(21) Appl. No.: 11/342,902

(22) Filed: Jan. 30, 2006

(65) Prior Publication Data
US 2007/0182198 A1 Aug. 9, 2007

(51) Int. Cl.
*E04H 15/58* (2006.01)

(52) U.S. Cl. .................... 296/177; 296/102; 135/88.01; 135/119; 403/109.3; 403/322.4; 403/325; 403/328; 403/361

(58) Field of Classification Search ............. 403/109.3, 403/325, 109.8, 326, 322.1, 328, 322.4, 330, 403/338, 361, 300, 302, 109.2, 109.5, 321, 403/327, 332, 38, 378, 379.1, 379.4; 296/102, 296/163, 177; 135/88.01, 96, 88.07, 117, 135/88.09, 118, 199, 119
See application file for complete search history.

(56) References Cited

U.S. PATENT DOCUMENTS

| | | | |
|---|---|---|---|
| 270,448 A * | 1/1883 | Mallory | 135/117 |
| 379,734 A | 3/1888 | Smith | |
| 929,067 A * | 7/1909 | Willaimson | 403/325 |
| 1,200,556 A * | 10/1916 | West | 296/102 |
| 1,622,292 A | 3/1928 | Bender | |
| 1,716,212 A * | 6/1929 | Cushman | 296/102 |
| 1,953,063 A * | 4/1934 | Coultas | 403/325 |
| 2,739,361 A * | 3/1956 | Elsner | 403/322.1 |
| 2,820,468 A | 1/1958 | Park et al. | |
| 2,942,914 A | 6/1960 | Noot | |
| 3,079,162 A | 2/1963 | Michels, Jr. | |
| 3,610,092 A * | 10/1971 | Miller | 403/330 |
| 5,025,821 A | 6/1991 | Page et al. | |

(Continued)

FOREIGN PATENT DOCUMENTS

FR 2 614 947 * 11/1988

OTHER PUBLICATIONS

Yahoo! Babel Fish Online Translation: France Etat Armement (FR 2 614 947); p. 7 lines 01-24. Jul. 7, 2008.*

(Continued)

*Primary Examiner*—Michael P Ferguson
(74) *Attorney, Agent, or Firm*—DLA Piper LLP US; R. Blake Johnston, Esq.

(57) ABSTRACT

A latching assembly for attaching an accessory such as a canopy to a wagon or other children's vehicle. Body tubes are positioned within each corner of the wagon and each features an exposed annular notch. The body tubes are engaged by latches attached to the four corner poles of the canopy. Each latch includes a housing within which pivoting latch fingers reside. Each latch finger includes button and jaw portions as well as leaf springs that urge the jaw portions into engagement with the annular notch of a corresponding body tube. A latch may be removed from the body tube by squeezing the button portions of the latch fingers together. This procedure is repeated for the remaining three corners of the wagon so that the canopy may be removed there from.

13 Claims, 6 Drawing Sheets

U.S. PATENT DOCUMENTS

| | | | | |
|---|---|---|---|---|
| 5,288,161 A * | 2/1994 | Graves et al. | ............... | 403/325 |
| 5,447,354 A | 9/1995 | Delp | | |
| 5,560,383 A | 10/1996 | Fuller | | |
| D388,473 S | 12/1997 | Pasin et al. | | |
| 5,816,633 A * | 10/1998 | Odom | ......................... | 294/51 |
| 5,833,251 A | 11/1998 | Peck | | |
| 5,975,613 A | 11/1999 | Sippel | | |
| 5,975,614 A | 11/1999 | Mc Grue | | |
| 6,152,461 A | 11/2000 | Dunks | | |
| 6,260,566 B1 | 7/2001 | LaFave et al. | | |
| 6,263,893 B1 | 7/2001 | Spinella et al. | | |
| 6,273,741 B1 * | 8/2001 | Schultz et al. | ............... | 439/358 |
| 6,446,981 B1 * | 9/2002 | Wise et al. | ................. | 280/7.17 |
| 6,454,340 B1 | 9/2002 | Miller et al. | | |
| D466,953 S | 12/2002 | Ortiz | | |
| 6,823,883 B1 | 11/2004 | Sears | | |
| 6,976,640 B2 * | 12/2005 | Chen | ...................... | 403/322.4 |

OTHER PUBLICATIONS

Yahoo! Babel Fish Online Translation of France Etat Armement (Fr 2 614 947) p. 7 lines 1-24. Jul. 7, 2008.*

* cited by examiner

ACCESSORY LATCHING ASSEMBLY

BACKGROUND OF THE INVENTION

The present invention relates generally to fasteners and latches and, more particularly, to an accessory latching assembly for wagons, riding toys and other children's vehicles and the like.

Riding toys, wagons and other children's vehicles are popular outdoor toys for children. Wagons are particularly popular due to their versatility. Parents often use wagons to transport their young children. While wagons provide an effective mode of transport, children riding in a wagon are often exposed to direct sunlight. Exposure to the sunlight over extended periods of time may result in sunburns or other harmful effects for children such as heat exhaustion. Young children are especially susceptible to the damaging effects of the sun. As a result, it has become desirable to affix canopies over the wagons to protect occupants or cargo from the sunlight. It is also desirable to provide canopies that may be removed so that the wagon may be easily stored or transported in a vehicle such as the family car.

The prior art includes a number of arrangements for attaching canopies to wagons in a removable fashion. U.S. Pat. No. 2,942,914 to Noot and U.S. Pat. No. 4,735,426 to McConnell illustrate wagons with removable canopies supported by vertical poles. In each patent, the bottom ends of the poles are removably received within bores formed in blocks within the wagon bed or within the wagon body itself. While such an approach permits the canopies to be easily removed, the canopies are not very secure in their attachment to the wagons. As a result, they could blow off of the wagons or be easily removed by children riding in the wagons.

U.S. Pat. No. 6,263,893 to Spinella et al. illustrates a wagon having a canopy with poles that have holes formed horizontally through their bottom ends. The bottom ends of the poles are removably received within tube-like brackets fastened to each corner of the wagon body. The tube-like brackets each feature a pair of holes that line up with the holes of a corresponding canopy pole when the canopy is installed on the wagon. For each tube-like bracket, a screw is placed through the bracket and pole holes with a nut attached to the screw on the other side of the assembly. As a result, the bottom end of each canopy pole is secured within its respective tube-like bracket. While such an arrangement securely fastens the canopy to the wagon, it is awkward and time consuming to remove as each of the four nuts must be removed from each of the four screws.

U.S. Pat. No. 6,260,566 to LaFave et al. discloses a wagon having threaded sockets attached to the tops of each of the four corners of the wagon walls. The wagon canopy features four poles with threaded fittings attached to their bottom ends. The threaded fittings engage the threaded sockets of the wagon body so that the canopy is secured to the wagon. While the arrangement does securely fasten the canopy to the wagon body, removal of the canopy is again awkward and time consuming.

It may be desirable to attach other accessories to a wagon or other children's vehicles in a removable fashion. Such accessories could include, for example, decorative flags and safety flags. As with the wagon canopies, it is desirable that the accessories be removable so that the wagon or children's vehicle may be easily stored and transported. It is also desirable that the accessories be securely fastened to the wagon or children's vehicle to prevent accidental removal.

Accordingly, it is an object of the present invention to provide an accessory latching assembly that attaches an accessory to a children's vehicle in a removable fashion.

It is another object of the present invention to provide an accessory latching assembly that may be quickly and easily released.

It is still another object of the present invention to provide an accessory latching assembly that securely attaches an accessory to a children's vehicle.

Other objects and advantages will be apparent from the remaining portion of the specification.

SUMMARY OF THE INVENTION

The present invention is directed to an accessory latching assembly for a children's vehicle such as a wagon. Each latching assembly includes a body tube that is fastened within the wall of the wagon. Each body tube includes an opening and an annular notch defined by a pair of annular ridges. Each latching assembly also includes a latch that includes a latch housing having a pair of cavities therein. A pair of latch fingers are pivotally mounted in the cavities. Each of the latch fingers includes a button portion and a jaw portion. A pair of leaf springs are also positioned within the cavities of the latch housing and urge the latch fingers to pivot in directions where the jaw portions engage the annular notch of the body tube. The jaw portions disengage the annular notch of the body tube when the button portions are squeezed towards one another.

The latch housing features an annular channel which receives the top end of the body tube. The latch also features a neck that engages the opening of the body tube when the latch is connected to the body tube. A pole may be attached to the latch so as to support the accessory which may be, for example, a canopy or a flag. The body tube features a circumferential indentation and circumferential barb so that it may be easily installed in a hole formed in a wall of a plastic wagon.

The following detailed description of embodiments of the invention, taken in conjunction with the accompanying drawings, provides a more complete understanding of the nature and scope of the invention.

DESCRIPTION OF THE PREFERRED EMBODIMENTS

Figure 1:
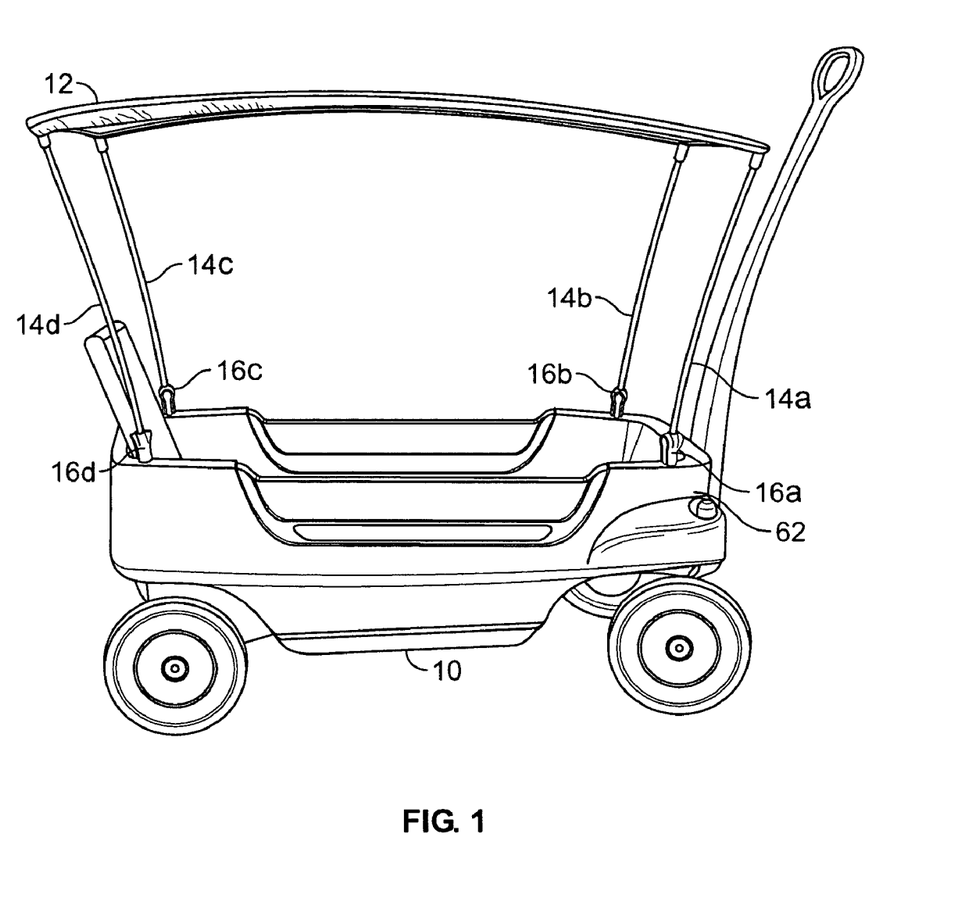
FIG. 1 is a perspective view of a wagon having a canopy attached by an embodiment of the accessory latching assembly of the present invention.
Figure 2:
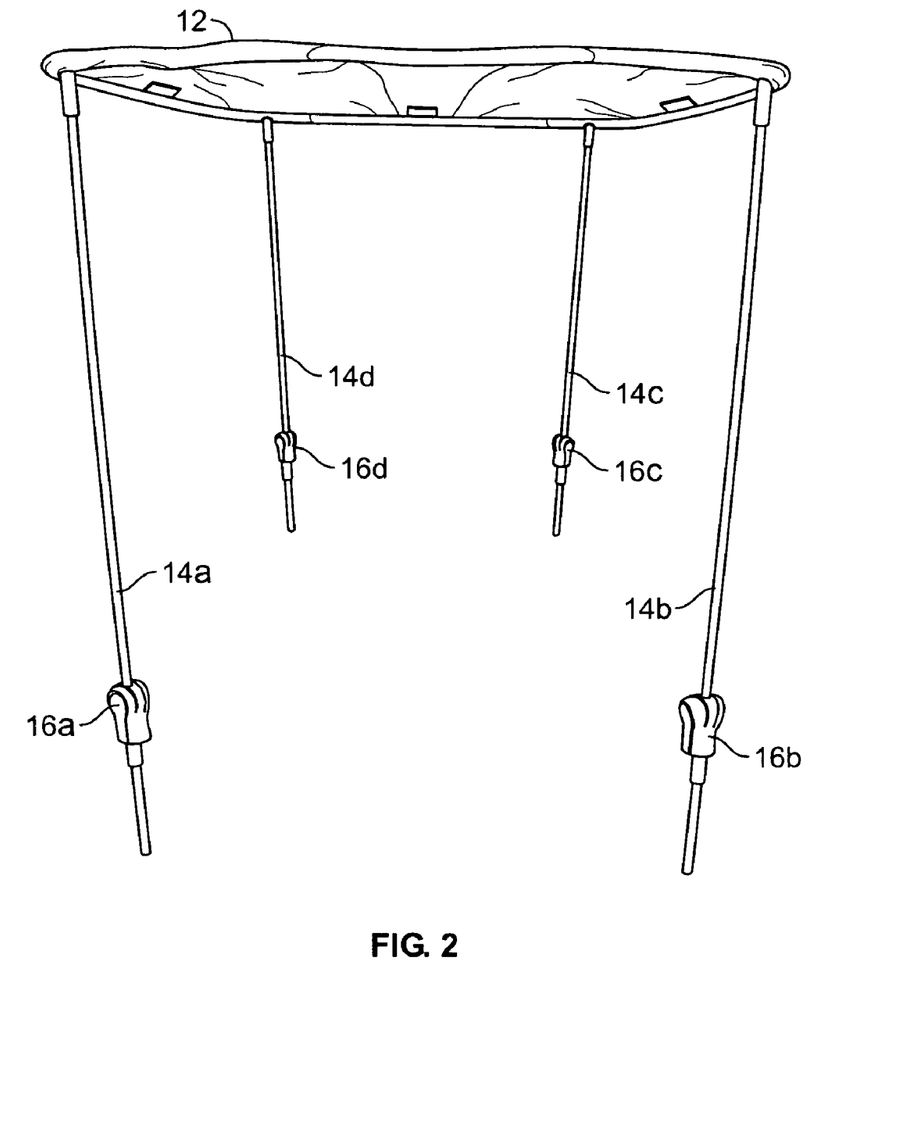
FIG. 2 is a perspective view of the canopy of FIG. 1 after removal from the wagon of FIG. 1.

A wagon 10 having a canopy 12 attached by an embodiment of the accessory latching assembly of the present invention is illustrated in FIGS. 1 and 2. More specifically, the canopy 12 is supported by four poles 14a-14d. At the bottom ends of the poles 14a-14d are latches 16a-16d, which are constructed in accordance with the present invention. The latches secure the poles to the wagon body so that the canopy is securely fastened to the wagon. As will be explained in greater detail below, each latch 16a-16d may be easily manipulated so that the bottom ends of the canopy poles are released from the body of wagon 10. The bottom ends of the canopy poles 14a-14c, and thus canopy 12, may then be easily removed from the wagon body 10.

While the present invention is described below in terms of use on a wagon canopy, the invention may alternatively be used to attach other accessories to wagons and other children's vehicles (or vehicles and objects in general). Such accessories include, but are not limited to, safety or decorative flags.

One of the latches of FIGS. 1 and 2 is indicated in general at 16a in FIGS. 3A-3C and 4. While latch 16a is described hereafter, it is to be understood that latches 16b-16d of FIGS. 1 and 2 feature the same construction.

Figure 3A:
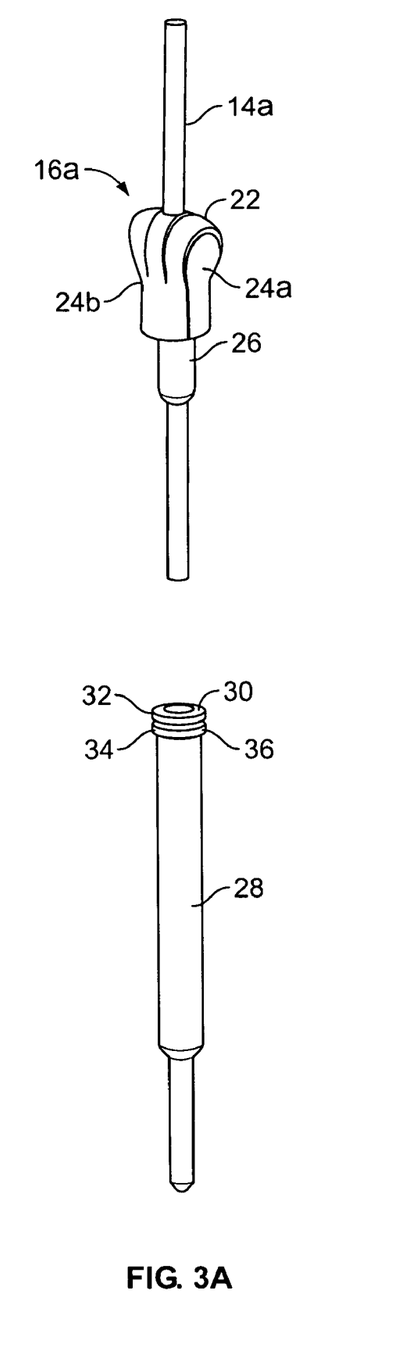
FIGS. 3A-3C are enlarged perspective views of the accessory latching assembly of the wagon and canopy of FIGS. 1 and 2 during the attachment of the canopy to the wagon and illustrating the corresponding fastening of the accessory latching assembly.
Figure 3B:
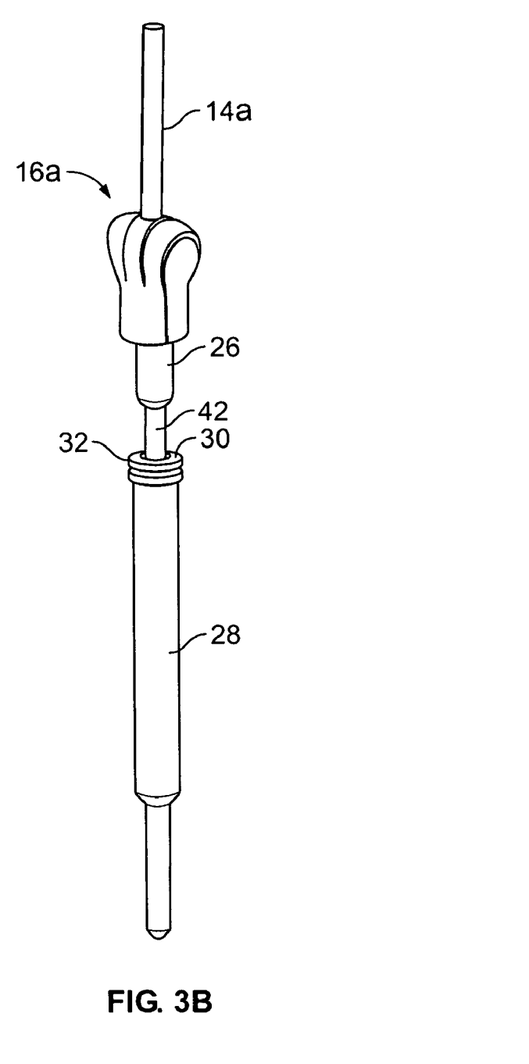
Figure 3C:
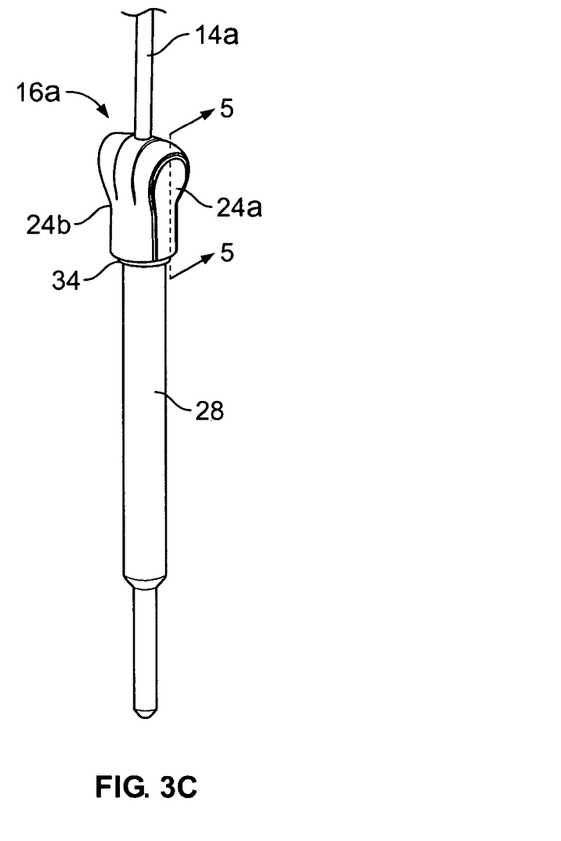
Figure 4:
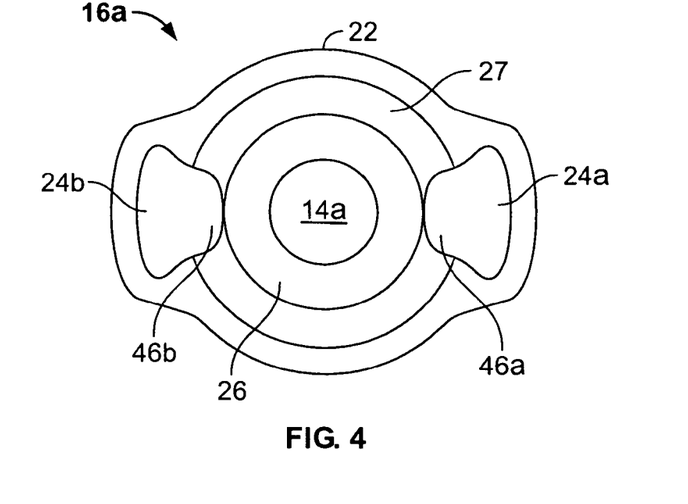
FIG. 4 is a bottom plan view of the latch and pole of FIGS. 3A-3C.

As illustrated in FIGS. 3A and 4, the latch 16a features a latch housing 22 and latch fingers 24a and 24b. Latch finger 24b is not visible in FIGS. 3A-3C but is identical in appearance and function to latch finger 24a. While the latch 16a is illustrated and described below as having two latch fingers, it could alternatively be constructed with one or more than two latch fingers. Latch 16a also features a neck 26 that extends downward from latch housing 22. The latch housing 22 and neck 26 are mounted on the lower portion of canopy pole 14a (see also FIGS. 1 and 2). An annular channel, illustrated at 27 in FIG. 4, is defined between the bottom portion of the latch housing 22 and the neck 26 of the latch 16a.

As will be explained in greater detail below, the latch fingers pivot or toggle within the latch housing so that the latch 16a may be removably connected to a body tube 28. Body tube 28 features a top opening 30 and a pair of vertically-spaced annular ridges 32 and 34. As a result, an annular notch 36 is defined between the two ridges. The opening 30 of the body tube 28 is sized to receive the neck 26 of latch 16a. In turn, the annular channel 27 (FIG. 4) of the latch 16a is sized to receive the annular ridge 32 and top end of the wall of tube 28 surrounding opening 30. As will be explained in greater detail below, body tube 28 is positioned within the walls at the corners of the wagon (10 in FIG. 1) so that only annular ridges 32 and 34, annular notch 36 and opening 30 are visible.

As illustrated in FIGS. 3B and 3C, when it is desired to install the canopy on the wagon (12 and 10, respectively in FIGS. 1 and 2), the bottom portion 42 of pole 14a is inserted into the opening 30 of the body tube 28. The neck 26 of latch 16a is next lowered through the body tube opening and the latch 16a is further lowered until the top end of body tube 28 and circumferential ridge 32 are received within the annular channel 27 (FIG. 4) of latch 16a and latching fingers 24a and 24b engage the annular notch (36 in FIG. 3A) of the body tube 28. As a result, the canopy pole 14a is securely fastened within the body tube 28, and thus the body of the wagon. The same procedure is simultaneously performed at the other corners of the wagon.

Figure 5A:
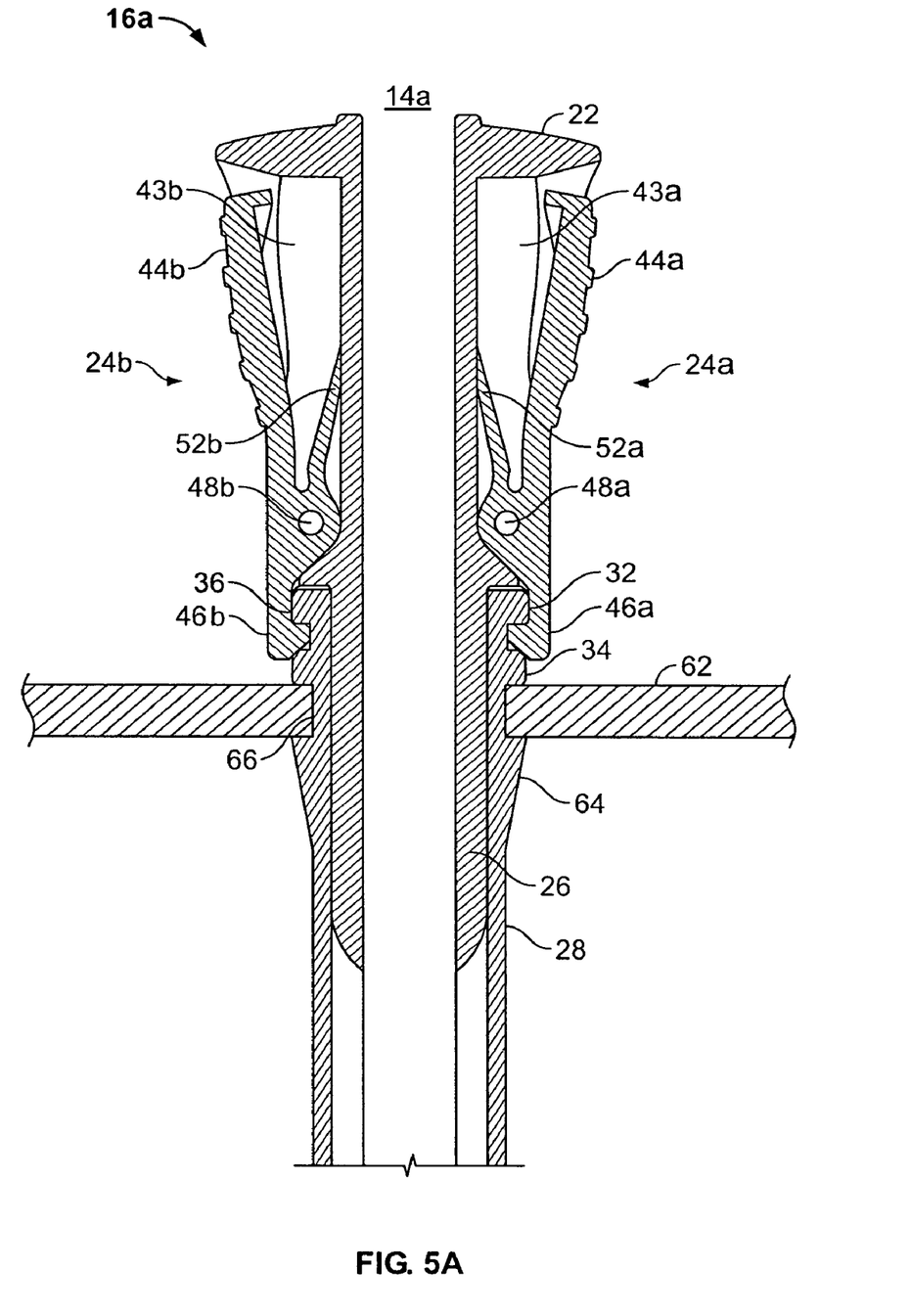
FIGS. 5A and 5B are cross-sectional views of the accessory latching assembly taken along line 5-5 of FIG. 3C illustrating the accessory latching assembly in the fastened and unfastened configurations, respectively.
Figure 5B:
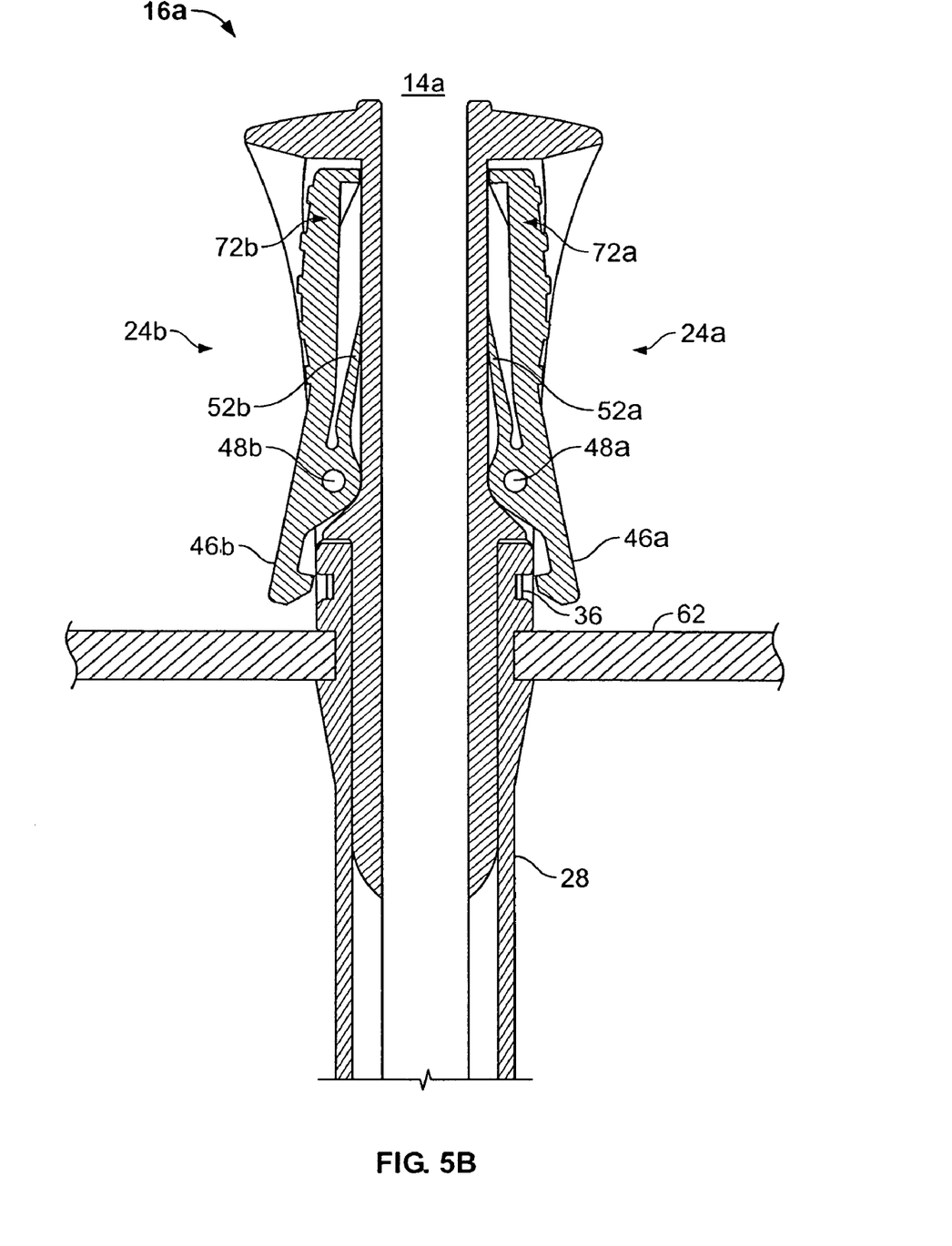

As illustrated in FIGS. 5A and 5B, the latch housing 22 of latch 16a has a pair of cavities 43a and 43b molded therein. The latch fingers, indicated in general at 24a and 24b in FIGS. 5A and 5B, are positioned within the cavities 43a and 43b. The latch fingers include button portions 44a and 44b and jaw portions 46a and 46b. The latch fingers are each pivotally mounted to the latch housing 22 by hinge pins 48a and 48b.

The latch fingers also each include leaf springs 52a and 52b that abut the back walls of the cavities 43a and 43b of the housing 22. Leaf spring 52a urges latch finger 24a towards pivoting in a clockwise direction. Conversely, leaf spring 52b urges latch finger 24b towards pivoting in a counter-clockwise direction. As a result, the jaw portions 46a and 46b of the latch fingers grip the annular notch 36 defined by the annular ridges 32 and 34 of the body tube 28. Furthermore, due to the shapes of the jaw portions 46a and 46b, they automatically pass over circumferential ridge 32 and snap into engagement within annular notch 36 when the latch 16a is lowered onto the top end of body tube 28.

As illustrated in FIGS. 1 and 5A, the wagon 10 features molded plastic walls 62. The body tube 28 features a circumferential barb portion 64 positioned below a circumferential indentation 66. Holes are formed in the top edge of the walls 62 at each corner of the wagon. The holes are sized so that the body tubes 28 may be securely held therein via circumferential indentations 66. The barb portion 64 permits the body tube 28 to be inserted through the hole in the wagon body wall 62 so that the wall snaps into engagement with the indentation. As a result, the lower portion of the body tube is housed inside of the wagon body. As stated previously, annular ridges 32 and 34 and the annular indentation 36 remain outside of the wagon body.

When it is desirable to remove latch 16a from the body tube 28 so that the canopy is removed from the wagon, the button portions 44a and 44b of the latch fingers are squeezed in the directions of arrows 72a and 72b in FIG. 5B. As a result, latch finger 24a pivots in the counter-clockwise direction about pin 48a, while latch finger 24b pivots in the clockwise direction around pin 48b so that jaw portions 46a and 46b are disengaged from annular notch 36. The latch 16a and pole 14a may then be lifted away and separated from the body tube 28 and wagon body wall 62 into the positions illustrated in FIGS. 3B and 3A. The procedure is repeated at the remaining three corners of the wagon with latches 16b, 16c and 16d (FIGS. 1 and 2) so that the canopy may be removed from the wagon.

With reference to FIG. 5A, the latch housing 22 and neck 26 are preferably molded from a single piece of plastic. Latch finger 24a, including button portion 44a, jaw portion 46a and leaf spring 52a, also preferably is molded from a single piece of plastic. The same may be said for latch finger 24b. Body tube 28 is also preferably molded from a single piece of plastic.

The present invention therefore offers an accessory latching assembly that is easy to manipulate. As a result, it permits easy removal of a canopy, or other accessory, from a wagon or other vehicle. The latching assembly of the present invention is also durable, simple and economical to construct.

While the preferred embodiments of the invention have been shown and described, it will be apparent to those skilled in the art that changes and modifications may be made therein without departing from the spirit of the invention.

What is claimed is:

1. A wagon comprising:
a wagon bed comprising a body having a generally vertical sidewall extending along the periphery of the body to define an enclosed area for the transport of children and cargo, the sidewall having a top edge having a plurality of holes;
a plurality of accessory poles having a top portion supporting an accessory and a bottom portion attachable to the wagon bed; and
an accessory latching assembly for removably attaching the accessory poles to the wagon bed, the accessory latching assembly comprising:

a body tube fastened within each hole in the top edge of the sidewall, the body tube having a longitudinally extending top opening and an annular notch in an outer surface of the body tube;

a latch mounted to the bottom portion of each accessory pole, each latch comprising:

a latch housing having an outer wall having a first cavity, a neck longitudinally extending from the latch housing, and an annular channel defined between the outer wall and the neck, the neck being received in the top opening of a corresponding body tube and the body tube being received in the annular channel in an engaged position of the latch to secure the accessory to the wagon bed;

a first latch finger pivotally mounted within the first housing cavity, the first latch finger having a button portion and a jaw portion positioned entirely within the first housing cavity, the jaw portion engaging the annular notch of the body tube in the engaged position;

a first spring urging the first latch finger to pivot in a direction wherein the jaw portion of the first latch finger engages the annular notch of the body tube; and wherein the latch may be disengaged from the annular notch of the body tube by pressing the button portion of the first latch finger so that the accessory may be removed from the wagon bed.

2. The wagon of claim 1, wherein the accessory comprises a canopy.

3. The wagon of claim 1 wherein the spring is a leaf spring.

4. The wagon of claim 1 wherein the first latch finger is pivotally mounted within the first cavity by a hinge pin.

5. The wagon of claim 1, wherein the latch housing includes a second cavity and the latch further comprises:

a second latch finger pivotally mounted in the second housing cavity, the second latch finger including a button portion and a jaw portion, the jaw portion of the second latch finger adapted to cooperate with the jaw portion of the first latch finger engaging the annular notch of the body tube in the engaged position; and a second spring urging the second latch finger to pivot in a direction where the jaw portion of the second latch finger engages the annular notch of the body tube, and wherein the latch may be disengaged from the annular notch of the body tube by pressing the button portions of the first and second latch fingers so that the accessory may be removed from the wagon bed.

6. The wagon of claim 1, wherein the accessory comprises a flag.

7. A wagon comprising:

a wagon bed comprising a body having a generally vertical molded plastic sidewall extending along the periphery of the body to define an enclosed area for the transport of children and cargo, the sidewall having a top edge having a plurality of holes;

a plurality of accessory poles having a top portion supporting an accessory and a bottom portion attachable to the wagon bed; and an accessory latching assembly for removably attaching the accessory poles to the wagon bed, the accessory latching assembly comprising:

a body tube fastened within each hole in the top edge of the sidewall, the body tube having a longitudinally extending top opening and having an annular notch and a circumferential indentation in an outer surface of the body tube, the body tube positioned through the top edge of the sidewall with at least a portion of the body tube positioned within the sidewall so that the circumferential indentation engages the opening of the top edge of the sidewall;

a latch mounted to the bottom portion of each accessory pole, each latch comprising:

a latch housing having an outer wall having a pair of cavities therein, a neck longitudinally extending from the latch housing, and an annular channel defined between the outer wall and the neck, the neck being received in the top opening of a corresponding body tube and the body tube being received in the annular channel in an engaged position of the latch to secure the accessory to the wagon bed;

a pair of latch fingers each pivotally mounted within one of the cavities, each of the latch fingers having a button portion and a jaw portion positioned entirely within the housing cavities, the jaw portion engaging the annular notch of the body tube in the engaged position;

a pair of springs each positioned within one of the cavities of the latch housing and each urging a corresponding latch finger to pivot in a direction where the jaw portion engages the annular notch of the body tube; and the jaw portions disengaging the annular notch of the body tube when the button portions are squeezed towards one another so that the accessory may be removed from the wagon bed.

8. The wagon of claim 7, wherein the accessory comprises a canopy.

9. The wagon of claim 7 wherein the pair of springs are leaf springs.

10. The wagon of claim 7 wherein the body tube includes a pair of spaced annular ridges that define the annular notch.

11. The wagon of claim 7 wherein the body tube includes a circumferential barb portion positioned adjacent to the circumferential indentation to facilitate the insertion of the body tube into the body of the wagon bed.

12. The wagon of claim 8 wherein the latch fingers are pivotally mounted within the cavities by hinge pins.

13. The wagon of claim 7, wherein the accessory comprises a flag.

* * * * *